United States Patent [19]
Yokoi

[11] 3,877,164
[45] Apr. 15, 1975

[54] DEVICE FOR MAKING LISTS BY COPYING PORTIONS OF DOCUMENTS IN AN INTEGRATED FORM

[76] Inventor: Junichi Yokoi, II-20, 2-chome, Wakaehonmachi, Higashi-Osaka, Japan

[22] Filed: Sept. 4, 1973

[21] Appl. No.: 393,740

[30] Foreign Application Priority Data
Aug. 6, 1972 Japan................................. 47-89864

[52] U.S. Cl. ............................................. 40/104.04
[51] Int. Cl.............................................. B42f 15/00
[58] Field of Search............ 40/102, 104.03, 104.04, 40/104.05, 104.06, 104.11–104.13, 104.17; 312/184, 185

[56] References Cited
UNITED STATES PATENTS
| | | | |
|---|---|---|---|
| 2,147,773 | 2/1939 | Larson............................. | 40/104.13 |
| 3,564,731 | 2/1971 | Weller................................ | 35/24 B |
| 3,690,261 | 9/1972 | Yokoi.............................. | 40/104.04 |

*Primary Examiner*—Robert W. Michell
*Assistant Examiner*—John H. Wolff
*Attorney, Agent, or Firm*—Tab T. Thein

[57] ABSTRACT

Device comprising replaceable holders for documents of which portions have to be copied in the form of integrated lists, a two-part actuating frame with upper and lower portions, a base plate disposed under the lower portion, and links connecting the frame portions. The document holders, having tongues and sub-tongues on opposite sides for interengagement and for holding the documents therebetween, are mounted in recesses in the frame portions, in either the longitudinal or the transversal direction, with suitable spaces apart. Preferably a suitable number of the recesses is provided in wire supporters which can be selectively inserted in concavities of the frame portions. When the two frame portions are folded, the documents inserted in the holders are brought into orderly arrangement, in an overlapping manner, each exposing a definite marginal index portion. Thus the original documents can be compiled into lists which can then be subjected to a conventional copying operation. Various alternative arrangements and modifications form part of the improved device.

10 Claims, 29 Drawing Figures

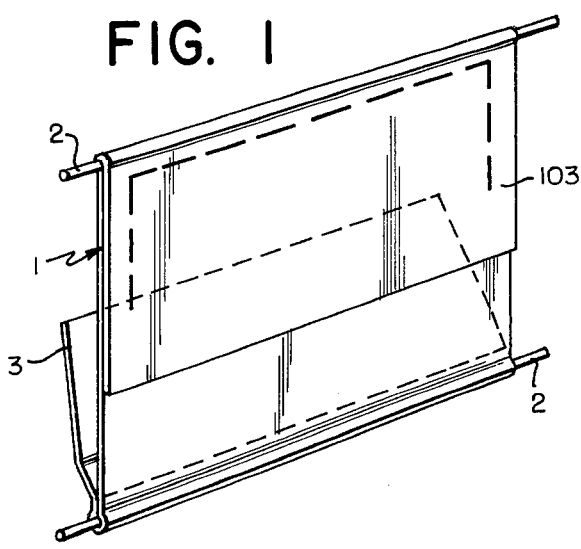
FIG. 1
FIG. 1A
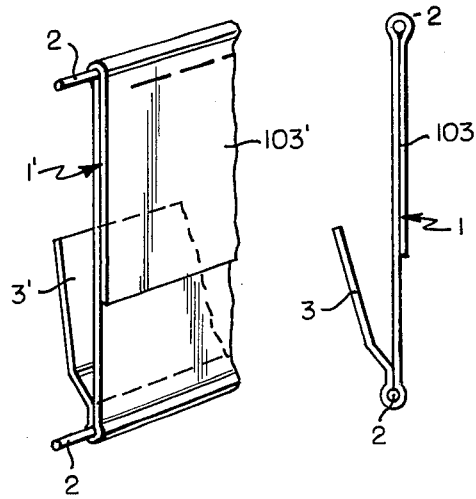
FIG. 2
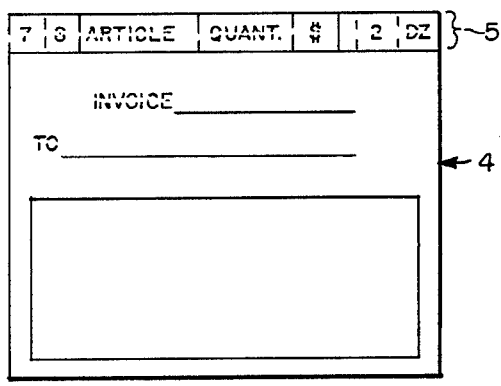
FIG. 3
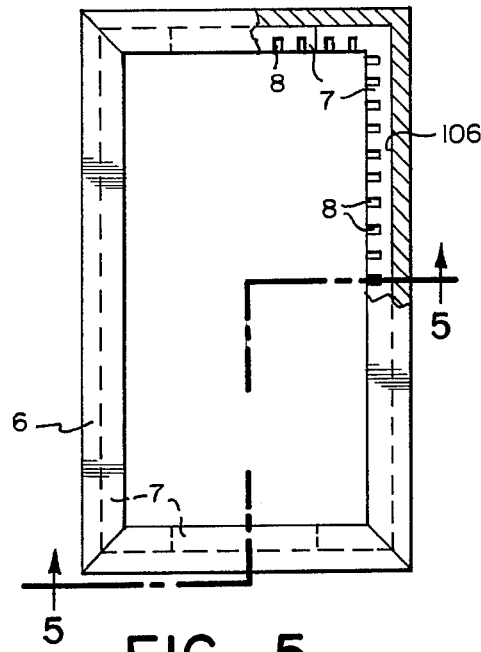
FIG. 4
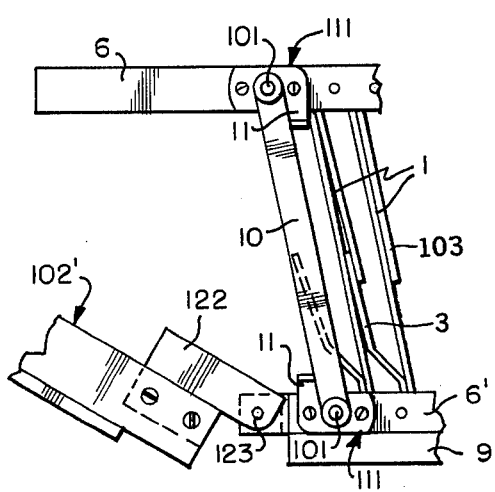
FIG. 11
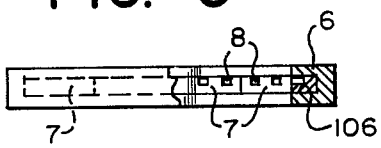
FIG. 5
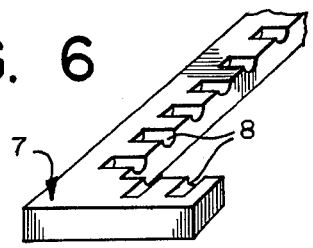
FIG. 6

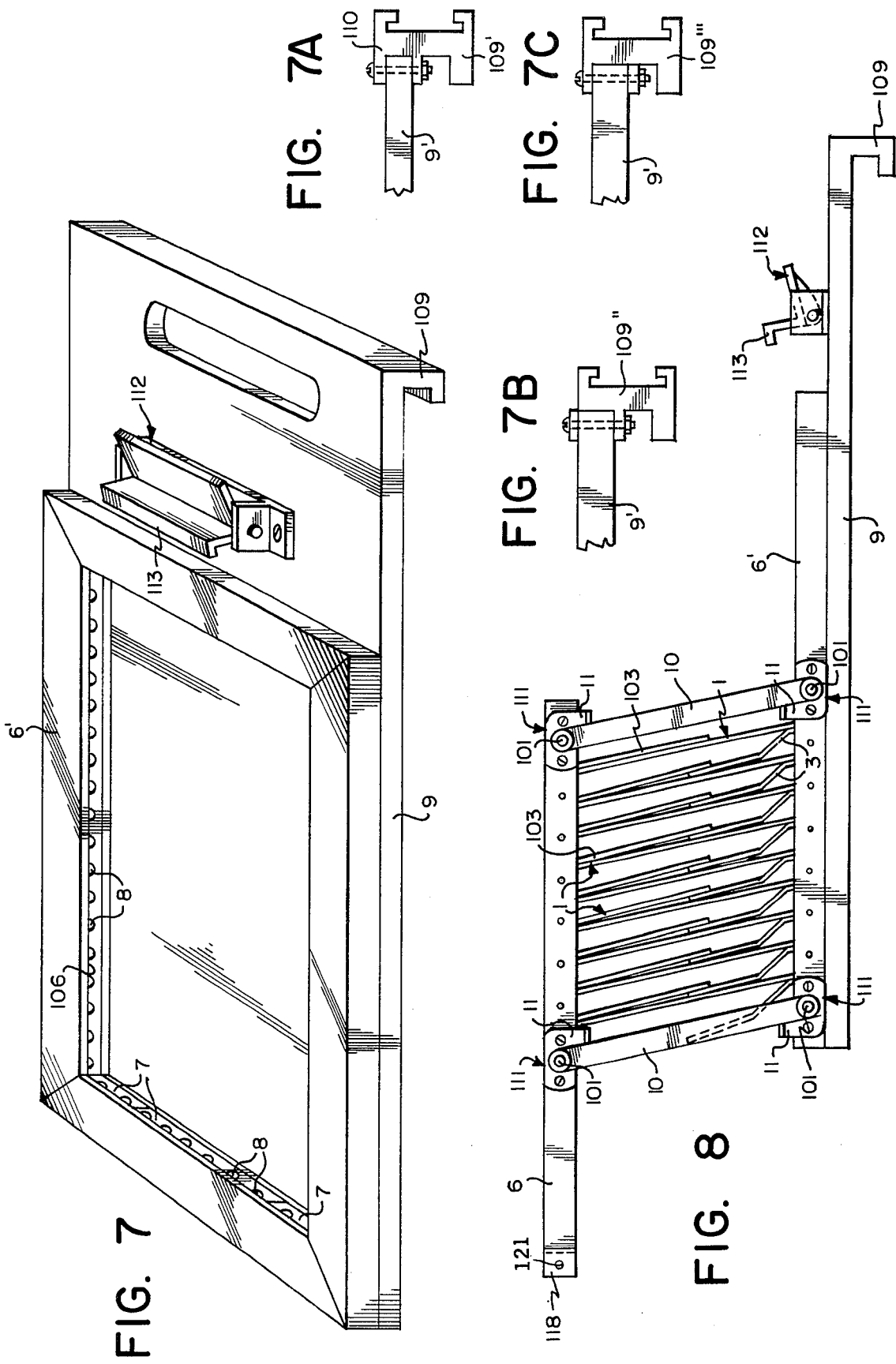

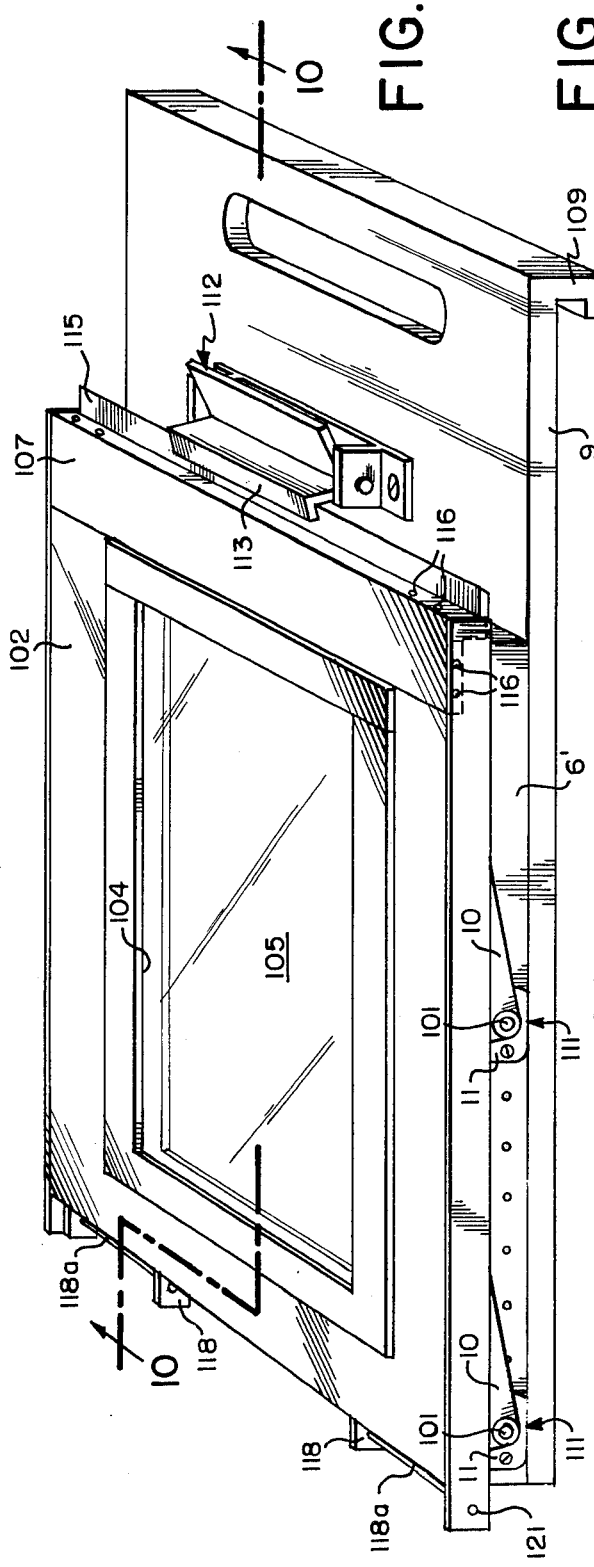
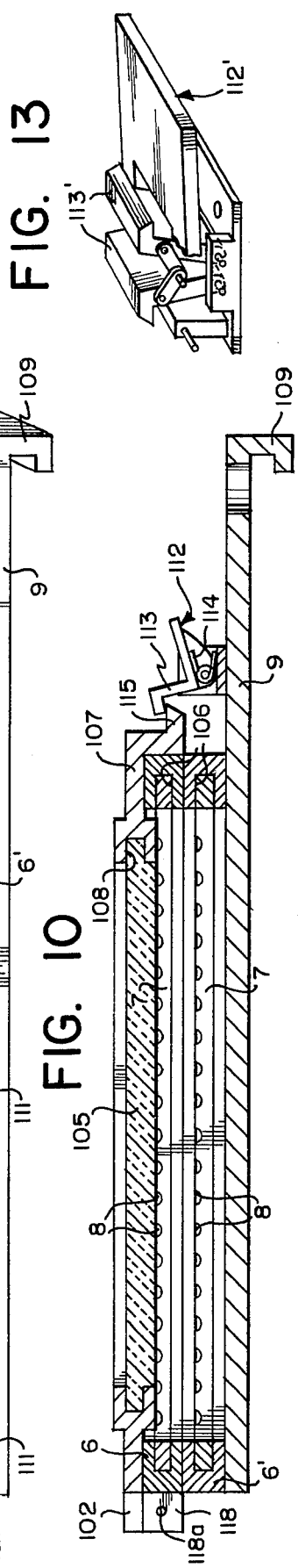
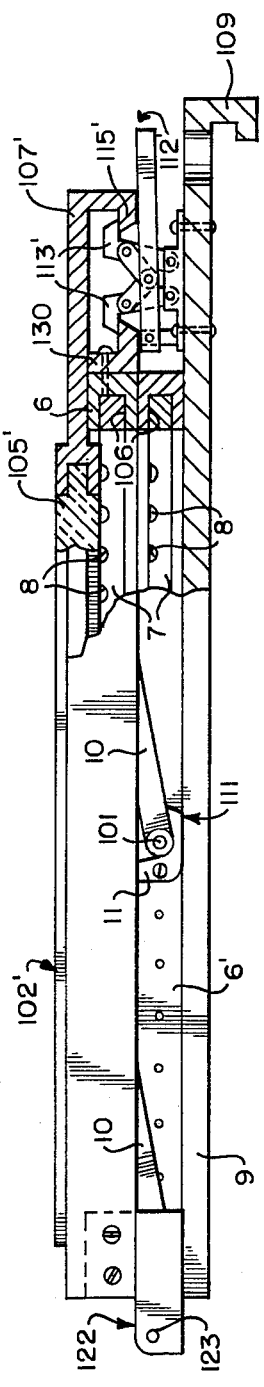

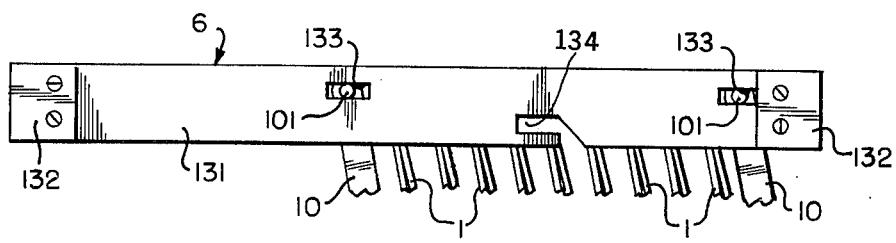
FIG. 14
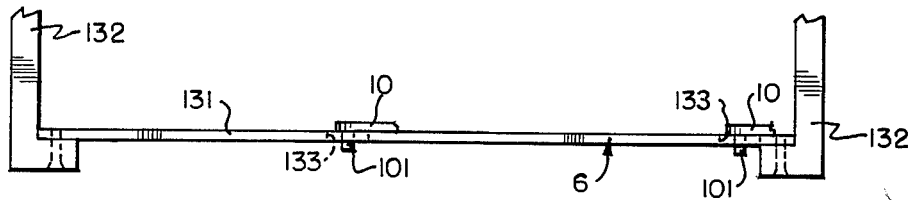
FIG. 15
FIG. 16　　　　FIG. 16A
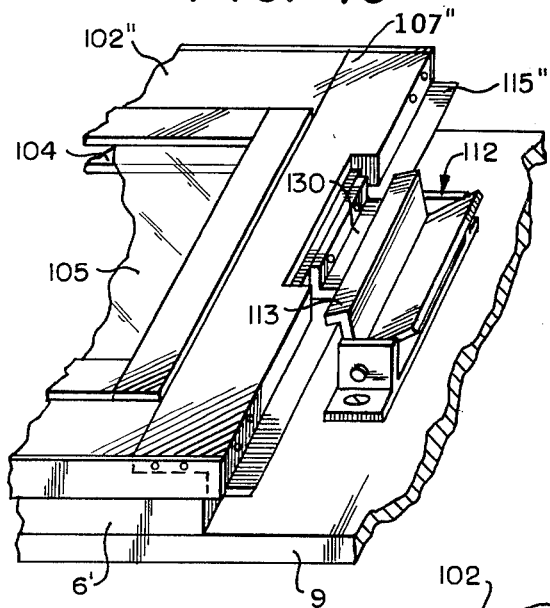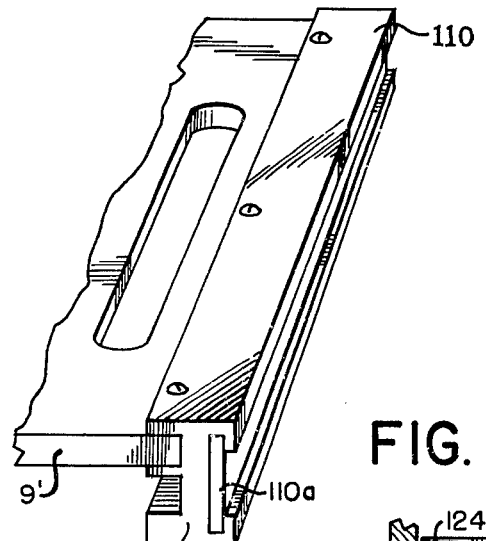
FIG. 18
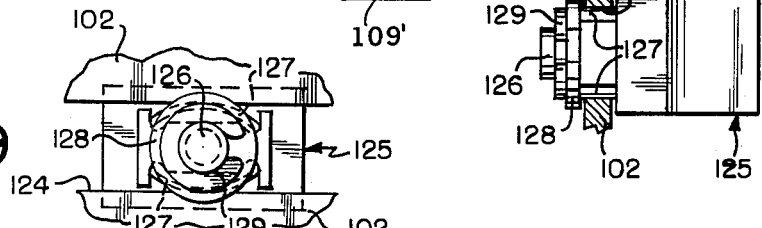
FIG. 17
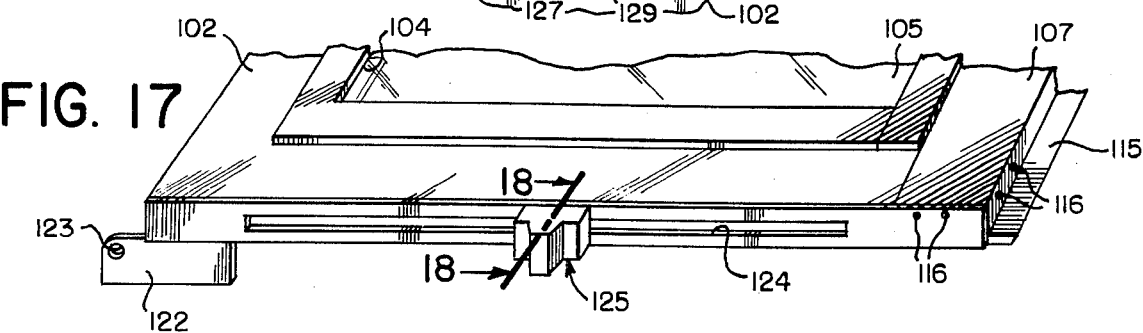

3,877,164

DEVICE FOR MAKING LISTS BY COPYING PORTIONS OF DOCUMENTS IN AN INTEGRATED FORM

The present invention relates to an improved device for making lists by copying portions of documents in an integrated form.

This is an improvement over applicant's own earlier U.S. Pat. No. 3,690,261 dated Sept. 12, 1972, titled "Device for Making Lists by Copying Portions of Documents in an Integrated Form."

In case lists or specifications are to be made from various slips, that is, in making for instance daily trail balances, ledgers, debit notes in trading firms, or cargo particulars in shipping firms, or for example lists of voters in a constituency in government and public offices, numerous documents had so far to be transcribed by handwriting. However, such a conventional method is disadvantageous in that it requires long time, and lists obtained are not always free of errors.

In the conventional copying operation for making lists, the documents were arranged into a list directly on the exposing surface of a copying machine. This caused much trouble in compiling the documents. In other conventional copying operations, attachments were used to insert and arrange documents into a list therein. By such attachments, however, the proper alignment of the document portions to be copied could not be obtained, and it was also impossible to keep the documents for a long period of time.

An object of the invention is to provide an improved device for making lists by copying portions of documents in an integrated form, by which lists can be made quickly, free of errors and in a simple operation.

A further object is to provide a device which eliminates some drawbacks and operational difficulties inherent in the own earlier patented device, and particularly in other prior-art devices, and to provide varied and multifarious copying set-ups which satisfy the most complicated and different requirements encountered in this area.

According to major features of the present invention, a number of document holders are provided between upper and lower frame portions of a two-part actuating frame, with tongues of the document holders engaged with sub-tongues of adjoining holders, whereby the original sheets or documents are safely held between the holders.

The inventive arrangement allows the manual insertion, copying and removing of the documents, wherein the recesses of the frame portions have substantially the same spacing to allow the holders to be selectively inserted by way of their wires in each consecutive, in each second, in each third recess, and so on, as the case may be, and wherein alternatively wire supporters can be inserted which are provided with a suitable number of recesses, so as selectively to expose a wide range of widths of the index areas of the documents when the upper frame portion is folded down onto the lower portion for copying the index areas, and also to be inserted in the longitudinal and the transversal directions.

Wire supporters are made up of several sections and fitted into concavities of the upper and lower frame portions. The latter are provided with holes for fitting links on the sides of longitudinal and transversal elements so that the upper frame portion can be folded down either in the longitudinal or the transversal direction, and therefore the document holders can be mounted in either direction.

The height of the document holders is made so as to comply with the minimum height of commercially available standardized forms such as daily trial balances and other documents as mentioned before. The index areas of the documents are thus prevented from being hidden by portions of the document holders.

By means of the device of the present invention, the original sheets or documents can be held substantially indefinitely, and their index areas are enlarged and reduced at will in proper alignment for copying without change in size, by mounting supporting wires of the document holders in the frame recesses at desired positions on the wire supporters.

The copying operation with the inventive device can be carried out readily, even by unskilled people.

With these features and advantages, the present invention obviates errors in manual transcription for making lists, and ensures improvements in efficiency of clerical work, a substantial reduction of labor costs, and a rationalization of document control.

In comparison to the own earlier patented device, there is a two-part actuating frame with upper and lower frame portions, instead of the sole (upper) frame of the earlier device. The holders with the documents therein are carried between the two frame portions, rather than between the sole frame and the base plate, as earlier. The holders have tongues and sub-tongues, on opposite sides, allowing the documents to be securely held therebetween. In several respects, the device of the present invention is superior to the earlier construction.

According to further but less important features, cavities are provided in the sides of the frame portions, wire supporters being inserted in the cavities, with the usual recesses for the wires of the document holders being formed in the supporters. Screw holes in the sides of the frames allow fixtures to be attached for securing link means pivotally connected to the frame portions, so that the upper portion can be pushed forward selectively in the longitudinal and the transversal directions.

The height of the tongues on the document holders is sufficient, according to the invention, to allow them to be slid underneath and engaged by the sub-tongues of adjoining holders when they are assembled in a planar position.

Various cover and document-holder embodiments are provided for the upper frame portion, some with transparent plates, and associated with clamp mechanisms which allow the upper frame alone, or that frame portion together with the cover or holder, to be pressed down and held in a coplanar position.

The cover may be in the form of a planar member, which may be partly cut away, so that the clamp may selectively depress both sides of the cut-away portion and an L-shaped member fitted to the cover.

The base plate of the device, underneath the lower actuating frame portion, may have a crooked or downwardly bent terminal portion; in a modified base plate, a channel bar may be used which also allows a label or description inserter to be used for ready identification of the documents assembled in the inventive device.

According to yet another inventive feature, an auxiliary table may take the place of a group of document holders, to be arranged and subsequently copied therewith. The structure according to the invention also allows the holders to be arranged longitudinally, transversally, as well as in single or double rows.

A modified cover or document holder has a groove with an index mechanism movable therealong, so that the forward or the rearward ends of the index areas of the documents can be inserted in the most forward and the most rearward ones of the holders by the use of an indicator when not all holders are filled with the documents. The mechanism may be provided in either the longitudinal or the transversal direction.

Owing to the unitary and well conceived structure of the inventive device, the various modifications and additional features are all compatible and can usually be applied to the same embodiment. Changes are easily made, even during use of the device.

Other objects and many of the attendant advantages of the invention will be readily appreciated as the same becomes better understood by reference to the following detailed description, when considered with the accompanying drawings, wherein FIG. 1 is a perspective view of an improved document holder of the inventive device;

FIG. 1A is a view similar to FIG. 1, partly broken away, of a somewhat modified document holder;

FIG. 2 is a side elevation of the document holder of FIG. 1;

FIG. 3 is a plan view of an example of an original sheet or document to be copied by means of the inventive device;

FIG. 4 is a plan view, with parts broken away, of one of the actuating frame portion for the device;

FIG. 5 is a front view of the frame portion, partly in section, along line 5 — 5 of FIG. 4;

FIG. 6 is an enlarged perspective view showing part of an axial wire supporter for the device;

FIG. 7 is a perspective view of a base plate mounted with a lower frame portion and a simple clamp mechanism;

FIG. 7A is a side view of an exemplary embodiment of a channel bar (such as being used in the embodiment of FIG. 16A);

FIG. 7B is a side view, similar to that of FIG. 7A, of a modified channel bar;

FIG. 7C is a side view, similar to those of FIGS. 7A and 7B, of another channel-bar embodiment;

FIG. 8 is a front view showing one embodiment of the assembled device of the invention (in the description, the "front" is considered to face the viewer, from the left-hand to the right-hand sides of the illustrations);

FIG. 9 is a perspective view showing a document cover or holder attached to an upper frame portion, held on the base plate by the clamp mechanism;

FIG. 10 is a longitudinal sectional view, taken along line 10 — 10 of FIG. 9;

FIG. 11 is a partial front view, similar to FIG. 8, of the left-hand end of the device, with the document holders in an upright position, for illustrating the attachment of an exemplary document cover (broken away);

FIG. 12 is a partly sectional view, somewhat similar to FIG. 10, illustrating how the upper frame portion and the document cover are held in coplanar arrangement by another clamp mechanism;

FIG. 13 is an enlarged perspective view of the clamp mechanism of FIG. 12;

FIG. 14 is a fragmentary front elevation of portions constituting the upper frame portion, showing some document holders suspended therein;

FIG. 15 is a top view of the actuating-frame portions shown in FIG. 14;

FIG. 16 is a partial perspective view, similar to FIG. 9, illustrating a modified clamp mechanism for simultaneously holding the upper frame portion and the document cover;

FIG. 16A is a partial perspective view of the base plate of the device, fitted with a channel bar (instead of a downwardly bent portion, as in FIGS. 7 to 10 or 12);

FIG. 17 is a partial frontal perspective view of the document cover fitted with an indicator;

FIG. 18 is a sectional view illustrating the mechanism of the indicator, taken along line 18 — 18 of FIG. 17;

FIG. 19 is a rear view of the indicator mechanism appearing in FIGS. 17 and 18;

Figure 20:
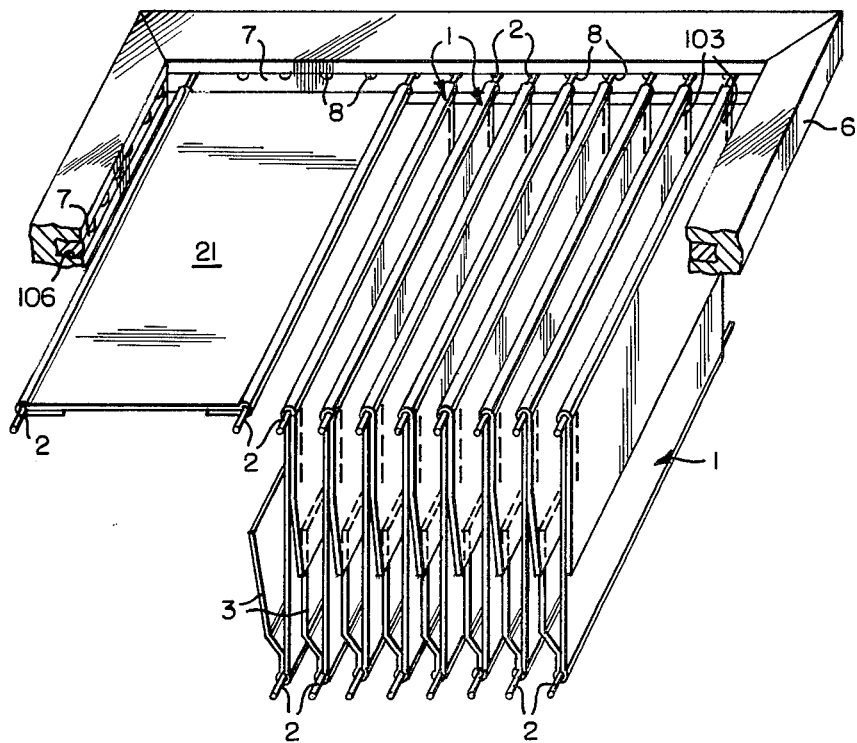
FIG. 20 is a view showing the document holders and an auxiliary document table as they are mounted on the upper frame portion.

Referring to FIGS. 1, 1A and 2, there is shown a generally oblong holder 1 or 1' for documents 4 (see FIG. 3) having index areas 5 in the inventive device, the holders being provided with tongues 3 or 3', respectively, above the lower longer edges, and sub-tongues 103 or 103' downward from the upper longer edges thereof on the sides opposite to the tongues 3, 3', and axial or lengthwise wires 2 along the upper and lower longer edges thereof, as shown.

As compared with the holder shown in FIG. 1A, that in FIG. 1 is improved in that it is stitched up together with the sub-tongue 103 as shown in broken lines, indicating stitches and the like, for the purpose of interposing the tongue 3 of one holder 1 more strongly between the latter and the sub-tongue 103 of an adjoining holder, as will be explained somewhat later. It can be seen in both figures, and particularly in the side view of FIG. 2, that the tongues 3, 3' extend somewhat higher than the lower edges of the sub-tongues 103, 103', for a better engagement therebetween when inserted (as shown for example in FIGS. 8 and 20).

Owing to the circumstance that features shown in one figure can readily be combined with those of others, the inventive device is discussed in a logical structural sequence rather than by the strict sequence of the accompanying illustrations.

Upper and lower actuating frame portions 6, 6' of a two-part actuating frame unit are made of concave material, and insertable wire supporters 7 provided with a suitable number of equally spaced recesses 8 for receiving the wires 2 of a number of document holders 1 or 1' are fitted into pairs of longitudinally and transversely opposed concavities 106 of the frame portions 6, 6' so as to cover the surfaces of the recesses 8. Details are shown in FIGS. 4 through 8. the wire supporters 7 are made up of a suitable number of sections, such as shown in FIG. 4, so that the recesses 8 are easily made therein.

It will be understood from the foregoing structural description that the inventive device for making lists allows the manual insertion, copying and removing of the documents 4, wherein the respective recesses 8 of the frame portions 6, 6' have either a substantially identical spacing, to allow the holders 1, 1' to be selectively inserted by way of their wires 2 in each consecutive, in each second, in each third recess, and so on, as the case may be, — or the recesses 8 may have a different spacing in a number of wire supporters 7 that are removably inserted in the concavities 106 of the frame portions, — whereby a wide range of widths of the index areas 5 of the documents can be selectively exposed when the upper frame portion 6 is folded down onto the lower portion 6' for copying the index areas.

As mentioned, there are provided two actuating frame portions in the improved device according to the invention, 6, 6', having the wiwre supporters 7 inserted therein, and one of them (the lower one, 6') is suitably fixed to a base plate 9 having a suitably crooked portion 109 (see FIG. 8), or on an alternative base plate 9' having a channel bar 109', 109" or 109''' (see FIGS. 7A to 7C) in its end, the channel bars being provided, in the plate 9', as will be explained somewhat later. The channel bar 109' . . . 109''' further has an oblong reinforcing member 110, as shown in FIGS. 7A, 16A for bar 109'. Element 110a of FIG. 16A will be described later. The upper frame portion 6 is placed above the lower portion 6', fixed on the base plate 9 or 9', in opposed relationship thereto.

At the same time, screw holes (not shown) for mounting fixtures 111 are made at appropriate places of the longitudinal and the transversal sides of each frame portion 6, 6', the fixtures 111 including stop members 11 and shafts 101 for pivotally supporting links 10. In assembling the device, the fixtures 111 are fitted to pairs of the screw holes in either the longitudinal or the transversal sides of the frame portions 6, 6' relative to the longitudinal or the transversal direction in which the fraames are pushed forward. The frame portions 6, 6' are connected through the links 10 which rest upon the respective shafts 101 of the upper and lower portions 6, 6'.

Figure 21:
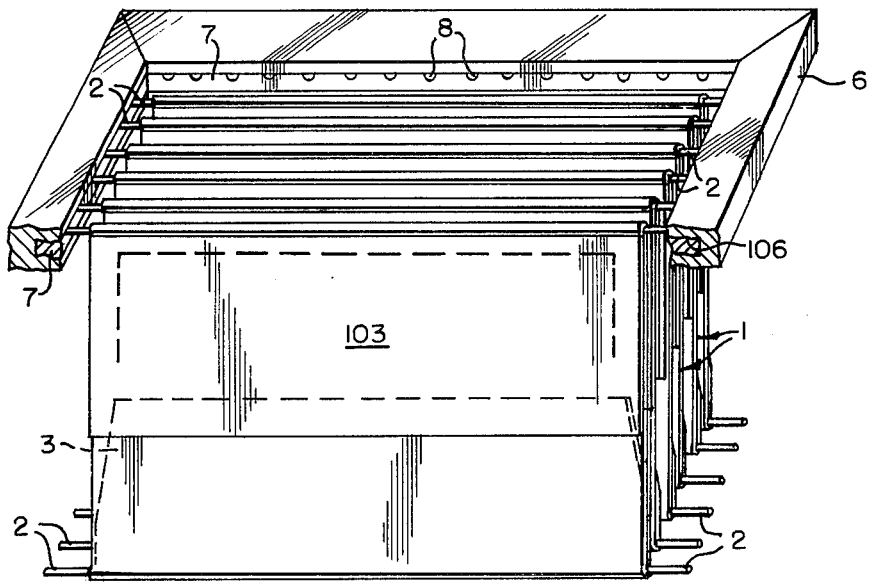
FIG. 21 is a view similar to FIG. 20 but with the document holders mounted sideways in the upper frame portion.
Figure 22:
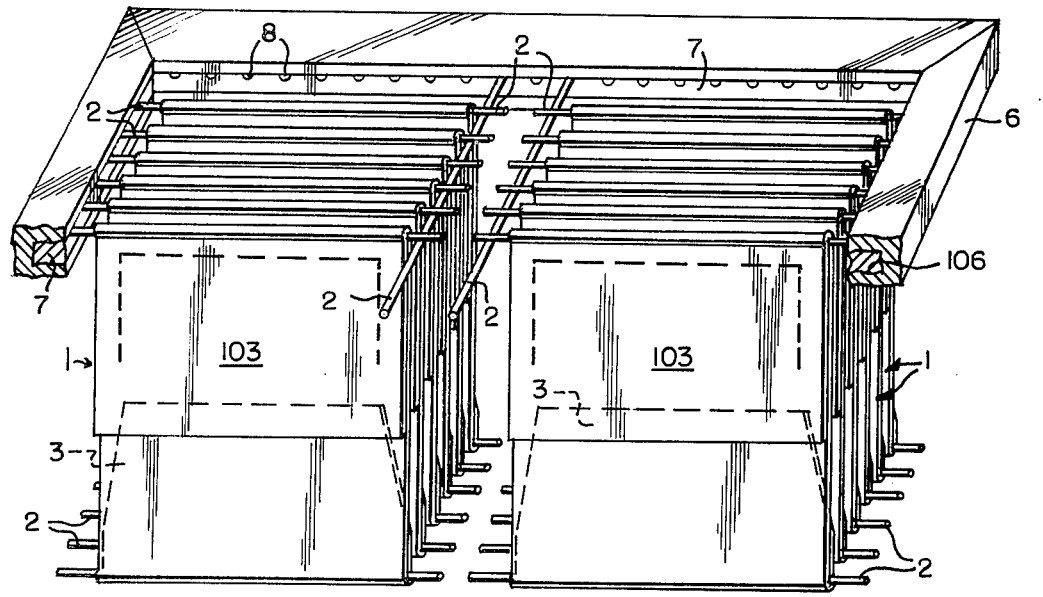
FIG. 22 is a view similar to those of FIGS. 20, 21 but with the holders mounted sideways, at half width, in a double line.

A number of documment holders 1 or 1' can be mounted at equal intervals between the frame portions 6, 6' in either the longitudinal or the transversal direction, as shown in FIGS. 20 and 21, or in a double line, in the same direction, as shown in FIG. 22, by mounting the wires 2 of the document holders 1, 1' in the recesses 8 at desired positions on the wire supporters 7 or by extending separate wires (also numbered 2) between two opposed sides of the upper actuating frame portion 6 so as to intersect and support the upper wires 2 of the document holders at their centers, to thus obtain a double-line arrangement of the holders. In this case, the document holder tongues 3, 3' are inserted between the document holders 1, 1' and the sub-tongues 103, 103' to interengage the document holders. The latter may have different lengths, as shown in FIG. 22 between the left- and right-hand sides or groups.

An auxiliary document table 21 may be provided in the upper frame portion 6 in a space corresponding to the height of the document holders, as shown in FIG. 20, to thus receive another document to be copied in the same manner as that of the vertically disposed document holders 1.

As shown in FIGS. 9 and 10, a document cover or holder 102 may be provided from a suitable material, having a concavity or a recess 104. This cover has a transparent (e.g., glass or plastic) plate 105 or 105' inserted along the concavity 104, and is fitted with a transversal element 107 having a concavity 108 (identified in FIG. 10), a planar member 115 serving also as a grip, and screw holes 116 for mounting screws or rivets into the screw holes through an appropriate, e.g., L-shaped reinforcing member which can be made with lateral limbs (not shown). Such members can cover the corner areas of the cover or holder 102, e.g., as shown in FIG. 9, above the screw holes 116. It will be understood by those skilled in the art that some earlier described parts are also shown in the figures, and they apply to the particular structure discussed, although not mentioned again.

The upper or lower frame portion 6, 6' is mounted with coupling fixtures 118 in the forward (left-hand) end thereof, as shown in FIGS. 9 and 10. The fixtures have elongated central portions (partly hidden in the illustration) and two lateral branches between which rod-shaped members 118a are provided passing through coupling-pin holes 121 of the document cover or holder 102.

FIGS. 11, 12 show an alternative document cover 102' which is also provided with fixtures 122 in the forward end thereof, the fixtures also having coupling pin holes 123, thereby allowing the cover to be connected to the frame portions 6, 6'. A transversal element 107' is used in this structure, similar to the element 107' of FIGS. 9 and 10.

Lengthwise grooves 124 are provided on both longitudinal outer sides of the cover or holder 102 or 102', e.g. as shown in FIG. 17, so that an indicator 125 may travel along the groove 124, the usage of which indicator will be explained later. The indicator 125 has a stem 126. The stem is inserted into the groove 124, sandwiched up and down by means of two plate springs 127, and mounted with a ring 128 and an E-shaped washer 129. The indicator system 125 can also be provided in the transversal sides or elements of the respective cover. The inner structure is illustrated in FIGS. 18 and 19.

In order to hold in a plane position both the upper frame portion 6 and the cover or holder 102 (or 102'), or the former alone, a clamp 112 is provided on the base plate 9, consisting of a hook 113 and a spring 114 as shown in FIG. 8. The clamp 112 is attached at a suitable position of the space formed on the base plate 9 on the side of the crooked portion 109 or on plate 9' having the channel bar 109' . . . 109''' therein (see FIGS. 7A to 7C).

As an alternative means for holding the upper frame portion 6 and the cover or holder 102' on the lower frame portion 6', an L-shaped member 130, serving also as a grip, is attached to the forward transversal side of the upper frame 6 as shown in FIG. 12 and, on the other hand, the planar member of the transversal element 109' of the document cover or holder 102' is bent like a hook 115' so as to face both the tip of the member 130 at the end of the upper frame portion 6, and also an inwardly bent portion at the right-hand end of the cover 102', at the end of the hook (see FIG. 12), to thus engage one of double hooks 113' of a clamp 112' fixed on the base plate 9 with the tips of the L-shaped member and the planar member of the transversal element, including the hook 115', on the document cover or holder 102'.

In another form of the means for holding the upper frame portion 6 in a plane position together with a cover or holder 102'', simultaneously, or the upper frame portion 6 alone, a planar member 115'' of the document cover 102'' is partially cut away relative to the position of the member 130 as shown in FIG. 16 so that the clamp 112 depresses both sides of the cut-away portion of the planar member 115'' and the member 130 attached to the upper frame portion 6. This embodiment has a transversal element 107'' slightly different from those of FIGS. 9/10 and 12.

In a further alternative means for holding the upper frame portion 6 on the lower frame 6', a top frame portion consisting of a longitudinal element 131 and preferably a pair of transversal elements 132 are provided as shown in FIGS. 14 and 15, the longitudinal element 131 having recesses 133, 134 in the upper and lower sides thereof.

On the other hand, the shafts 101 for supporting the links 10 of the frame frame portions 6, 6' are lengthened so that these shafts can be selectively fitted into the upper or lower recesses 133, 134 (FIGS. 14, 15), thereby allowing the upper frame portion 6 to be held in a planar position above the lower frame portion 6'. Parts 133, 134 are shown for element 131 but they are of course also included in element 132 for use in the perpendicular direction.

Figure 23:
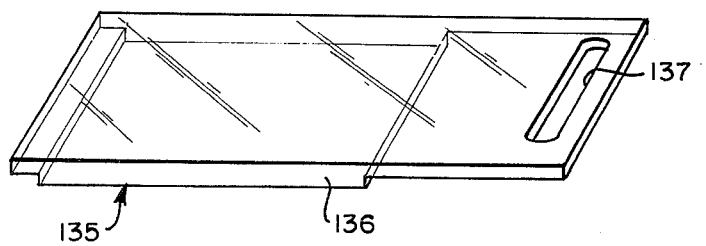
FIG. 23 is a perspective front view of a transparent document-holder plate used in the inventive device.
Figure 24:
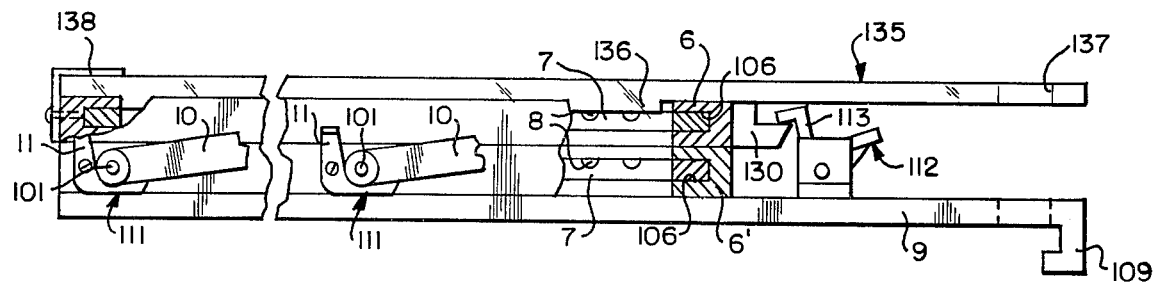
FIG. 24 is a partly sectional front view of the device, similar to FIG. 10, but fitted with the transparent plate of FIG. 23.

In yet another alternative means for holding the upper frame 6 on the lower frame 6', a transparent holding plate 135 may be provided (FIGS. 23, 24) instead of the cover or holder on the upper frame portion 6. The plate 135 consists of a convex element 136 for pressing the index areas of the documents 4 and of an elongated hole 137 corresponding to that of the base plate 9. This is done by fitting the plate 135 into the space formed between the surface of the upper frame portion 6 and a securing plate 138 attached to the forward transversal element of the upper frame portion 6, screw holes of plate 138 being used for the attachment of the holding plate 135 to the upper frame portion 6. The clamp structure 112, 113 is similar to or identical with that described for FIG. 16.

In operation, the plane member 115, 115' or 115'' of the respective document cover holder 102, 102' or 102'' is released from the hook 113 or 113' of the clamp 112 or 112', and the upper actuating-frame cover is opened, or the transparent plate 135 is removed from the upper frame portion 6. When this frame is then pushed forward while being lifted upward from the lower frame portion 6', the upper frame portion is held at a predetermined angle since the links 10 are brought into abutment with the stop members 11 of the fixtures 111 while, at the same time, the document holders 1 or 1' are brought to an upright position with a constant distance with respect to one another, with the tongues 3 or 3' opened and engaged with the subtongues 103 or 103' respectively.

In this position, when the desired original sheets or documents 4 are respectively inserted in the document holders 1, 1' as by dropping therein, with the index areas 5 of the documents 4 upward, they are retained by means of the tongues 3, 3'.

When the upper frame portion 6 is next folded down into a parallel, planar relationship with the lower frame portion 6', the index areas of the documents interposed between the rear sides of the holders 1, 1' and the subtongues 103, 103' engaged with the tongues, 3, 3' are exposed in proper alignment in the same plane. In this case, the auxiliary document table 21 may be attached, if necessary, to the upper frame portion 6 to receive a separate document thereon.

With such an arrangement, when the cover holder 102 . . . 102'' is closed by means of the clamp 112 or 112', or the transparent plate 135 is placed on the upper frame portion 6, the index areas 5 of the documents 4 and an auxiliary document on the table 21 are held by the cover (e.g., 102) or the plate 135 while, at the same time, they can be seen through the transparent plate 105 of the cover or through the plate 135. The documents 4 and the auxiliary document on the table 21 can thus be complied into a single list in an integrated manner, and securely held together at the same time.

The documents thus complied in the inventive device are photographed or copied by turning the device upside down and setting it on the exposing surface (usually a glass plate or window) of a conventional copying machine to thus make lists from the index areas of the documents in an integrated form.

When the device of the present invention is applied to a copying machine adapted to use sensitive paper included in a cassette or paper in a roll which can be cut into optional lengths, and if all the document holders are not filled with documents but some of them are left vacant, the present invention provides an economical use of the sensitive paper of the copying machine by showing the forward or the rearward extremity of the index area of a document inserted in the most forward or the most rearward holder by means of the indicator 125 travelling along the grooves 104 provided in the longitudinal elements of the respective document cover or holder (e.g., 102).

A description inserter 110a, shown in FIG. 16A, attached to the crooked portion 109 or provided in the recess of one of the channel bars 109 . . . 109''' of the respective base plates 9, 9', serves to insert a description or legend therein (bar 109' being shown in FIG. 16A), which shows the contents of the documents compiled in each device of the present invention so that the lists made by the device can easily be classified. This figure also shows the reinforcing member 110.

With the various described features and operational advantages, the present invention ensures improvements in efficiency of clerical work and a substantial reduction of labor costs.

It should be understood by those skilled in the art that the description does not intend to relate to separate and independent embodiment, but to a unitary structure having several detail features that can be successfully combined and reconciled with each other.

It will thus be understood, of course, that the foregoing disclosure relates only to preferred embodiments and appropriate modifications of the invention, and it is intended to cover all changes and modifications of the examples described which do not constitute departures from the spirit and scope of the invention.

What I claim is:

1. A device for making lists by copying portions, such as index areas (5), of oblong documents (4) in an integrated form, comprising, in combination, replaceable oblong holders (1, 1') somewhat larger than the documents to be accommodated, said holders having tongues (3, 3') at one of the longer edges thereof and sub-tongues (103, 103') at the opposite longer edges, on the sides of said holders opposite to those having said tongues thereon, for receiving therebetween the documents of which the index areas are to be copied, said tongues and said sub-tongues having substantially the same lengths as said holders, lengthwise upper and lower wires (2) attached to portions of said holders along said longer edges, said wires being substantially parallel with each other and with said tongues and said sub-tongues, a two-part actuating frame including an upper (6) and a lower (6') frame portion, each having two pairs of parallel sides and a plurality of opposed recesses (8) in all sides, for receiving therein respective groups of said upper and said lower wires to mount said holders in any desired spaced-apart relation between said frame portions, a base plate (9, 9') disposed in facing relationship with said upper frame portion, said lower frame portion being fixed to said base plate, parallel-motion link means (10) pivotally connected to said frame portions, and stop means (11) for said link means, so that said upper frame portion may be raised and folded down onto said lower frame portion in a continuous parallel relationship, for the purpose of manually inserting, copying and removing the documents, wherein the respective recesses of said frame portions allow selectively to expose a wide range of widths of the index areas of the documents when said upper frame portion is folded down onto said lower frame portion for copying the index areas, and also selectively to insert said holders in the longitudinal and the transversal directions.

2. The device as defined in claim 1, further comprising a plurality of opposed concavities (106) provided in said sides of the frame portions (6, 6'), supporters (7) removably inserted in said concavities and being formed therealong with a suitable number of said recesses, and screw holes made in all sides of said frame portions, for mounting thereon fixtures (111) to attach said link means (10), so that said upper frame portion (6) can be pushed forward selectively in the longitudinal and the transversal directions.

3. The device as defined in claim 1, wherein the height of said tongues (3, 3') is sufficient to allow them to be slid underneath and engaged by said sub-tongues (103, 103') of adjoining holders (1, 1') when assembled in a substantially planar position.

4. The device as defined in claim 1, wherein said upper frame portion (6) includes a document holder (102 . . .) in the form of a planar member (115 . . .), connectable to said lower frame portion (6'), while a clamp (112) including a hook (113) is attached to said base plate (9) which has an extension constituting a grip, said hook being engageable with said planar member, so that said document holder, pressing down said lower frame portion, can be held in a coplanar position by means of said clamp.

5. The device as defined in claim 4, further comprising an L-shaped member (130) fitted to said document holder (102"), and wherein said planar member (115") is partly cut away in the region of said L-shaped member, so that said clamp (112) selectively depresses said L-shaped member and both sides of the cut-away portion of said planar member.

6. The device as defined in claim 1, wherein said upper frame portion (6) includes a document holder (102'), further comprising a clamp mechanism (112") having a double hook (113'), said mechanism being attached to said base plate (9), a bent portion (115') at the end of said document holder, and an L-shaped member (130) on said upper frame portion, both being engageable by said double hook, so that said upper frame portion and said document holder can be selectively held in a planar position by means of said clamp mechanism.

7. The device as defined in claim 1, further comprising a top frame, including longitudinal (131) and transversal (132) elements, provided on said upper frame portion (6), said longitudinal element having recesses (133, 134) in its upper and lower sides, and link-supporting shafts (101) for supporting said link means (10), which shafts are extended, so that the latter can selectively be fitted into the upper (133) and the lower (134) recesses, thus allowing said upper frame portion to be held in the planar replationship with said lower frame portion (6').

8. The device as defined in claim 1, further comprising a document holder (102 . . .) attachable to one of said frame portions (6, 6'), a transparent plate (105 . . .) fitted to said document holder, an auxiliary document table (21) attachable to said upper frame portion (6) in a space formed in the latter, so that the documents inserted in said holders (1, 1'), placed in a planar position, and said auxiliary table, are pressed down and held by means of said transparent plate.

9. The device as defined in claim 8, further comprising an indicator (125) movable along grooves (124) provided in longitudinal elements of said document holder (102), so that selectively the forward and the rearward ends of the index areas of the documents can be inserted in the most forward and the most rearward ones of said holders (1, 1') upon appropriate positioning of said indicator, when only some of said holders are filled with the documents.

10. The device as defined in claim 1, further comprising a transparent holding plate (135) on said upper frame (6), fitted in a space limited by a securing plate (138) attached to one side of said upper frame portion, so that said holding plate may serve as a cover.

* * * * *